Feb. 16, 1943.  J. SCHIERENBECK  2,310,999
MEANS FOR INDICATING LIQUID LEVELS
Filed Nov. 30, 1939

Julius Schierenbeck
INVENTOR.

BY

HIS ATTORNEYS

Patented Feb. 16, 1943

2,310,999

UNITED STATES PATENT OFFICE 2,310,999

MEANS FOR INDICATING LIQUID LEVELS

Julius Schierenbeck, Heidelberg, Germany;
vested in the Alien Property Custodian Application November 30, 1939, Serial No. 306,811
In Germany December 1, 1938

3 Claims. (Cl. 73—313)

My invention relates to means for the indication of liquid levels and has for its main object to provide liquid level indicating means for containers having high internal pressure.

It has previously been suggested to use floats in liquid level indicators for measuring liquids under pressure, the position of the float being indicated by mechanical, magnetic or electrical means. The use of floats, however, is faced with difficulties or made entirely impossible if the pressure prevailing in the liquid container is very high, say above 200 atmospheres, because floats capable of withstanding pressures of this order are too heavy and no longer capable of floating. A weight compensation with the aid of spiral springs, or the like, is attended with the drawback that the liquid level can be determined only within a comparatively narrow range.

It is, therefore, an object of my invention to provide, in combination with an indicating tube joined to a container for high pressure fluid, means for maintaining the same liquid level in the container and indicating tube and means for reliably indicating the liquid level in the indicating tube.

Another object is to provide float means operating satisfactorily under high pressures to indicate the liquid level by cooperation with liquid level indicating means, e. g., electrical and/or magnetic means.

Another object is to provide means which may be manipulated to blow out, clean and reset the indicating device at intervals with the aid of the internal pressure of the container.

Another object is to provide means for preventing the float means from interfering with the cleaning and resetting manipulations.

Other objects and advantages of my invention will be apparent from the following detailed description of the preferred embodiment thereof, as illustrated in the drawing in which:

Figure 2 is an enlarged sectional view of the indicating tube showing a hollow bell float and low level stop means; while

Figure 2:
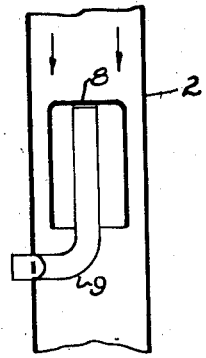
Figure 1:
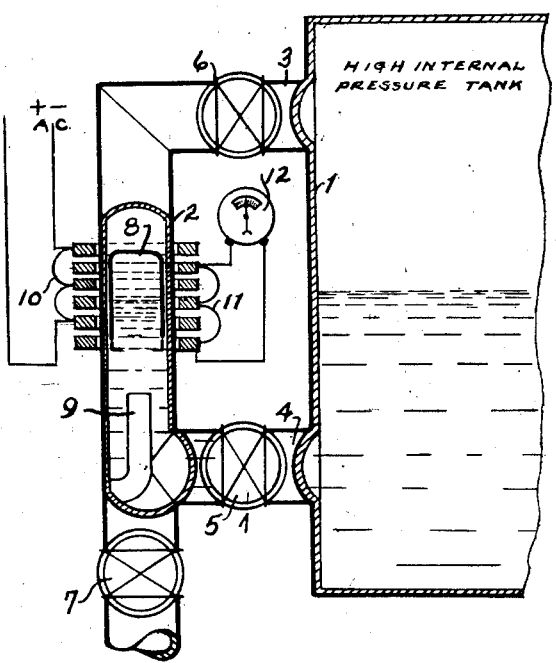
Figure 1 is a cross sectional view of a preferred form of my liquid level indicator connected to a high pressure container.

Referring to Figure 1, the numeral 1 designates a high pressure container to which the indicating tube 2 is connected through short connecting pieces 3 and 4 carrying the valves 5 and 6. A valve 7 is arranged in the indicating tube 2 below the connecting piece 4 carrying the valve 5. A hollow bell float 8 is located within the indicating tube 2 and kept afloat by the pressure of the gas within its wells. A solid or hollow rod 9 is mounted in the axis of the liquid level tube 2 at a small distance above the lower connecting piece 4 to receive the bell 8, as shown in detail in Figure 2, when the tube 2 is blown out. The latter may easily be accomplished by closing valve 5 and opening valves 6 and 7, enabling the pressure of the high pressure container to blow out through the indicating tube 2 which is cleaned thereby. Simultaneously, the bell float 8 receives fresh gas and the device may be reset by closing valve 7 and opening valves 5 and 6. The numerals 10 and 11 indicate, respectively, primary and secondary coils which are arranged alternately through the zone in which the liquid level is to be measured in such a manner as to be mutually inductive. The primary coils are connected in series and are energized from a 110 volt A. C. source. The secondary coils are also connected in series and their free terminals are connected to an indicator 12 of the voltmeter type. The bell float is made of magnetic material and as the position of the float varies, the number of the secondary coils capable of inducing an electromotive force from the primary coils varies. The voltage generated in the secondary coils is directly proportional to the number of coils functioning to induce an electromotive force in the secondary coil and accordingly, the voltage indicated at 12 is directly dependent upon the position of the bell float and thereby indicates the liquid level in the system. The particular electrical means for indicating the position of the float is well known in the art and other known electrical and/or magnetic means for indicating the position of the float may obviously be used in place of that described.

Figure 3:
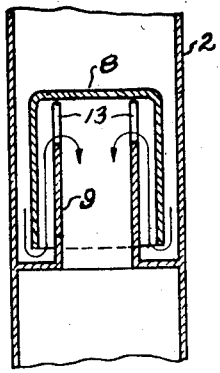
Figures 3 and 4 are similar sectional views of the indicating tube showing other embodiments of the bell float and low level stop means.
Figure 4:
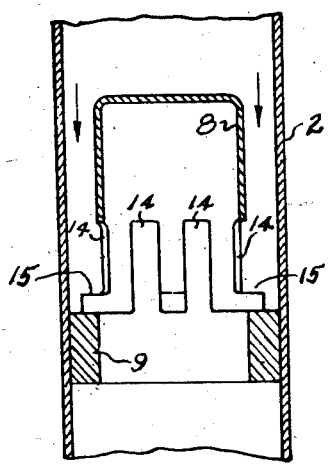

According to Figure 3, the downward movement of the bell float is stopped by means of a hollow cylinder 9 provided with holes or slots 13 that permit the interior of the bell float to be thoroughly flushed out by the gas when the indicating tube is blown out. The downward movement of bell float 8 may also, as illustrated in Figure 4, be stopped by an insert or ring 9 supported inside the indicating tube 2, by any suitable supporting means, e. g., screws or merely by a tight fit. In this embodiment the bell is provided with slots or openings 14 enabling the gas to penetrate into the interior of the bell 8 and with pieces 15 bent outward at right angles to the sides of the float between the slots 14 to engage the ring 9.

Contrary to expectation there are no inaccuracies in measurement when using bell floats in my electrical liquid level indicator either by the gas underneath the bell being adsorbed by the liquid or the bell being caught on the walls of the indicating tube. The surface of the liquid which presents itself to adsorption inside the small bell float is so small that a partial adsorption of the gas content of the bell has no bearing on the indication.

Moreover, since the gas space left inside the bell float only is of very little height, any influences which the normal fluctuations of the working pressure may cause will play no appreciable part in the accuracy of the measurement.

If greater changes in pressure should occur, such as in starting or discontinuing the operation, the gas pressure underneath the bell can be rectified in a simple manner by blowing out the indicating tube as described above.

Having fully described the preferred embodiment of my invention, it is to be understood that I do not intend to limit the scope of my invention to the exact construction or the use herein set forth, which may obviously be varied within the spirit of the appended claims.

What I claim is:

1. A liquid level indicating means for containers having high internal pressure, comprising a container for the high pressure fluid, a vertically disposed indicator tube joined to the container by upper and lower horizontally disposed connecting tubes, valve means disposed in each connecting tube, other valve means disposed in the indicating tube below the level of the lower connecting tube, whereby the various valve means may be manipulated to enable the internal pressure of the container to blow-out and clean the indicator tube at intervals, a hollow bell-shaped float disposed in the indicator tube, low level stop means for the float supported in the lower portion of the tube above the valve means disposed therein, and liquid level indicator means associated with the indicator tube.

2. In a liquid level indicating means as claimed in claim 1, a ring-shaped low level stop means supported in the indicating tube at the desired low level and a hollow bell-shaped float means cooperating with said low level stop means, at least one of said means being provided with holes adapted to admit gas to the interior of the float means when the device is blown out.

3. In a liquid level indicating means as claimed in claim 1, said hollow bell-shaped float being of magnetic material, and electromagnetically controlled indicating means cooperating with the float for indicating changes of liquid level.

JULIUS SCHIERENBECK.